(12) United States Patent
Ratnam et al.

(10) Patent No.: US 11,249,313 B2
(45) Date of Patent: *Feb. 15, 2022

(54) IMAGES WITH SWIFT-EYE MOVEMENT

(71) Applicant: Facebook Technologies, LLC, Menlo Park, CA (US)

(72) Inventors: Kavitha Ratnam, Woodinville, WA (US); Andrew Maimone, Duvall, WA (US); Marina Zannoli, Redmond, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/917,869

(22) Filed: Jun. 30, 2020

(65) Prior Publication Data

US 2020/0333604 A1 Oct. 22, 2020

Related U.S. Application Data

(63) Continuation of application No. 16/367,992, filed on Mar. 28, 2019, now Pat. No. 10,725,304.

(51) Int. Cl.
*G02B 27/01* (2006.01)
*G02B 27/00* (2006.01)
*G06F 3/01* (2006.01)

(52) U.S. Cl.
CPC ..... *G02B 27/0172* (2013.01); *G02B 27/0093* (2013.01); *G06F 3/013* (2013.01); *G02B 2027/0138* (2013.01); *G02B 2027/0178* (2013.01)

(58) Field of Classification Search
CPC . G06F 3/013; G06F 3/011; G02B 2027/0178; G02B 2027/0138
See application file for complete search history.

(56) References Cited

U.S. PATENT DOCUMENTS

| 9,711,114 | B1* | 7/2017 | Konttori | G02B 27/0093 |
| 10,725,304 | B1* | 7/2020 | Ratnam | G06F 3/013 |
| 2016/0240013 | A1* | 8/2016 | Spitzer | G02B 27/0179 |
| 2018/0284451 | A1* | 10/2018 | Eash | G06F 3/011 |
| 2019/0113970 | A1* | 4/2019 | Nijs | G02B 27/017 |
| 2019/0204910 | A1* | 7/2019 | Held | G06T 11/60 |
| 2020/0081527 | A1* | 3/2020 | Agaoglu | G06K 9/0061 |

* cited by examiner

*Primary Examiner* — Liliana Cerullo
(74) *Attorney, Agent, or Firm* — Freestone Intellectual Property Law PLLC; Aaron J. Visbeek

(57) ABSTRACT

An image is rendered to a display of a head mounted display. A swift-eye movement is identified. A compensatory image is rendered to a secondary display in response to identifying the swift-eye movement.

19 Claims, 9 Drawing Sheets

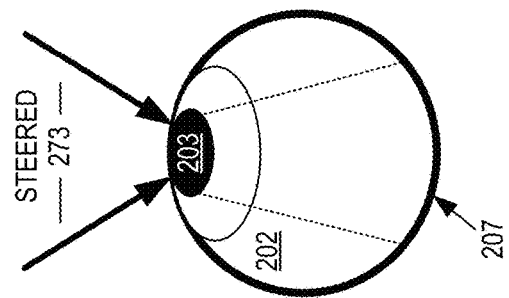
FIG. 2C
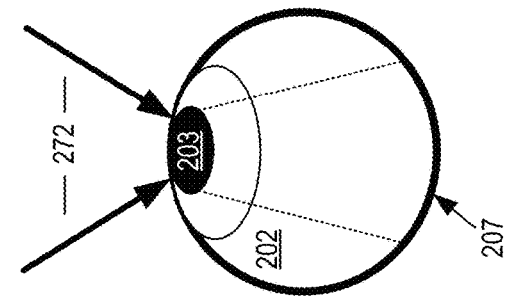
FIG. 2A
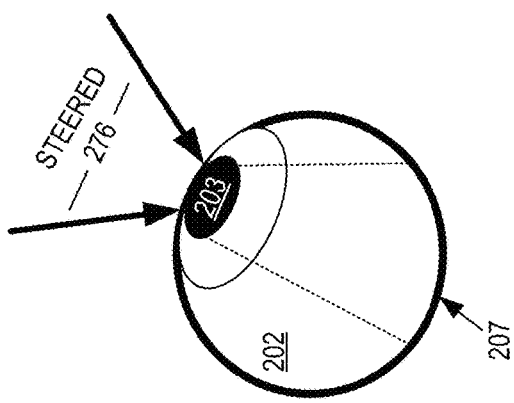
FIG. 2E
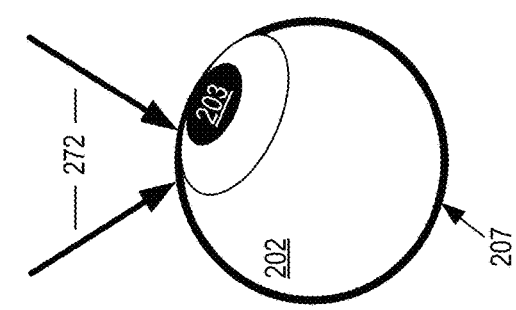
FIG. 2D
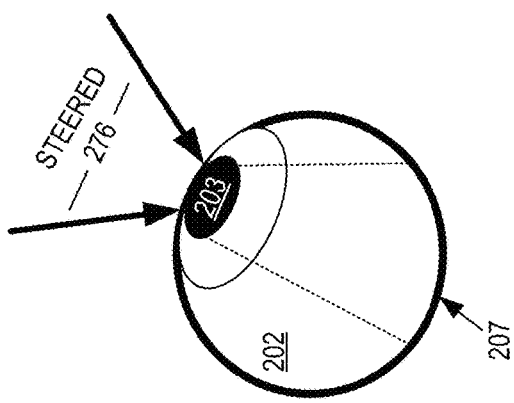
FIG. 2F
FIG. 2B

IMAGES WITH SWIFT-EYE MOVEMENT

CROSS REFERENCE TO RELATED APPLICATIONS

This application claims priority to U.S. non-provisional application Ser. No. 16/367,992 filed Mar. 28, 2019, which is hereby incorporated by reference.

TECHNICAL FIELD

This disclosure relates generally to head mounted displays, and in particular to presenting images with swift-eye movement

BACKGROUND INFORMATION

Head mounted displays (HMDs) present display light to a user of the head mounted display. The display light is received through the pupil and becomes incident on the retina of the user so the user can perceive the image included in the display light. Since the pupil is relatively small, it is important that the display light is directed toward the pupil even if the eye moves.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 2A-2F illustrate scene light and steered display light with respect to pupil position, in accordance with embodiments of the disclosure.

DETAILED DESCRIPTION

Figure 1:
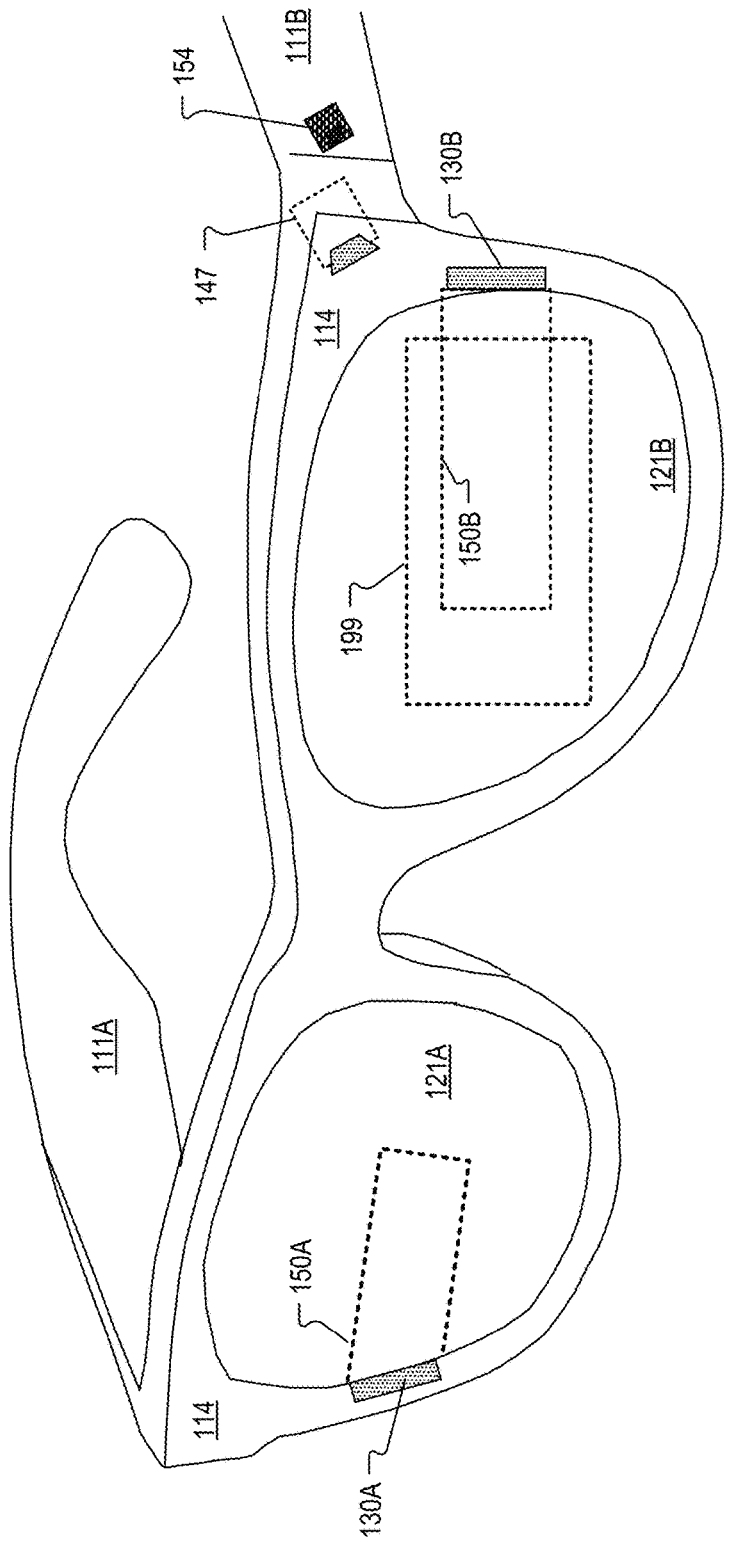
FIG. 1 illustrates an example HMD including a secondary display for presenting a compensatory image during swift-eye movements, in accordance with an embodiment of the disclosure.

Embodiments of rendering a compensatory image with a secondary display in response to identifying a swift-eye movement are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

This disclosure includes embodiments of rendering a compensatory image with a secondary display in response to identifying a swift-eye movement. Some head mounted displays (HMDs) include eye-tracking modules that sense the position of a pupil of a user. While there are many useful reasons to sense the user's eye position, in some contexts, the position of the eye is provided to a steerable display so that the steerable display can steer display light into the eye even when the user moves her eye to different eye positions. In some HMDs, a mechanical or electro-optic mechanism is used to steer the display light, for example, and steering display light may be referred to as "pupil steering."

Latency is a common challenge in pupil steering systems when a sensor and eye-position logic take some amount of time to identify the position of the eye and then steer the display light to the identified or predicted eye position. This latency may cause misalignment between the pupil position and the display light and the viewer may notice a vignetting of a virtual image, reduction in virtual image resolution or contrast, and/or a change in luminance of the virtual image. When the user has a swift-eye movement (e.g. saccade, vestibulo-ocular reflex, fast pursuit eye movements), the undesirable vignetting or luminance change may be especially pronounced, and in some cases no image will be seen by the user. In general, a swift-eye movement is an eye movement equal to or larger than one degree of visual angle over a short time period (e.g. 300 ms or less).

Applicant's studies and experimentation suggest that the human visual system is less sensitive to (but not completely blind to) certain changes in the retinal image and that presenting a compensatory image to the eye during a swift-eye movement may reduce or eliminate the user's perception that undesirable vignetting or luminance change has occurred. For example, sharp spatial or temporal transitions of a virtual image during eye movements may be noticed or detected by a user while changes in the fidelity of the image may not necessarily be noticed by the user. In other words, spatiotemporal discontinuities in the retinal image during an eye movement may go undetected if sharp transitions (e.g. sharp changes in brightness) and/or the spatial frequency spectrum of the image is maintained (even when the actual content is lost).

In embodiments of the disclosure, a compensatory image is rendered on a secondary display in response to identifying a swift-eye movement where an image from a steerable display has missed or will miss the pupil. The compensatory image may be presented for a very brief time period (e.g. 50-200 ms) until the steerable display has steered the image to the new pupil position. The compensatory image may have an overall luminance that is similar to the image being presented by the steerable display so that the absence of all or a portion of the image for a brief time period will be less noticeable or undetected by the user. In one embodiment, the compensatory image has a spatial frequency spectrum that is similar to the image being presented by the steerable display so that the absence of all or a portion of the virtual image for a brief time period will be less noticeable or undetected by the user. The compensatory image includes a pseudo-random pattern of a given spatial frequency distribution, in some embodiments. These and other embodiments are described below in connection with FIGS. 1-9.

FIG. 1 illustrates an example HMD 100 including a secondary display for presenting a compensatory image during swift-eye movements, in accordance with an embodiment of the disclosure. HMD 100 includes frame 114 coupled to arms 111A and 111B. Lenses 121A and 121B are mounted to frame 114. Lenses 121 may be prescription lenses matched to a particular wearer of HMD or non-prescription lenses. The illustrated HMD 100 is configured to be worn on or about a head of a user of the HMD.

The frame 114 and arms 111 of the HMD 100 may include supporting hardware of HMD 100. HMD 100 may include any of processing logic, wired and/or wireless data interface for sending and receiving data, graphic processors, and one or more memories for storing data and computer-executable instructions. Processing logic may be disposed with or embedded in frame 114 and arm(s) 111. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Lenses 121 may appear transparent to a user to facilitate augmented reality or mixed reality where a user can view scene light from the environment around her while also receiving image light directed to her eye by a display of HMD 100. Consequently, lenses 121 may be considered (or include) an optical combiner. In some embodiments, image light is only directed into one eye of the wearer of HMD 100.

Each optical combiner 121 may include a waveguide 150 to direct display light generated by a display 130 to an eyebox area for viewing by a wearer of HMD 100. Display 130 may include an LCD, an organic light emitting diode (OLED) display, micro-LED display, quantum dot display, pico-projector, scanned beam, or liquid crystal on silicon (LCOS) display for directing display light to a wearer of HMD 100. In some embodiments, display light is only directed into one eye of the wearer of HMD 100. In an embodiment, both displays 130A and 130B are included to direct display light into waveguides 150A and 150B, respectively.

Camera 147 may be configured to image an eyebox area for eye-tracking purposes. Camera 147 is an example of a sensor that may be used for eye-tracking purposes. Infrared illuminators (e.g. infrared LEDs) may illuminate the eyebox area with narrow band infrared light. Camera 147 may capture images that include the narrow band of infrared light emitted by infrared illuminators while rejecting (and not imaging) other wavelengths of light, including visible light. Eye-tracking camera 147 is positioned in the temple-area of frame 114, in the illustrated embodiment, but an eye-tracking camera may be disposed in any position that allows it to image the eyebox area. The eye-tracking camera 147 may include an infrared bandpass filter that passes an infrared wavelength band corresponding to the infrared beam emitted by infrared illuminators. The bandpass filter may be disposed over an image sensor of the eye-tracking camera and the infrared bandpass filter may reject light outside the infrared wavelength band.

The example HMD 100 of FIG. 1 includes an example positioning of a secondary display 199 that presents the compensatory image to the eyebox area. All or a portion of secondary display 199 may be included with, or embedded in, lens 121B. Secondary display 199 may be a transparent organic light emitting diode (OLED), micro-LED, or a transparent liquid crystal display (LCD). Secondary display 199 may be an optical element including one or more diffractive structures that are illuminated by a light source in illumination element 154. Illumination element 154 may include more than one light source for illuminating different diffractive structures in the optical element. The diffractive structures may correspond to different compensatory images so that illuminating the optical element with different angles or wavelengths, for example, will generate different compensatory images. The diffractive structures may comprise a volume hologram, polarization volume hologram, metasurface, or switchable Bragg grating.

Although camera 147, secondary display 199, and element 154 are illustrated on only one side of HMD 100, they of course may be duplicated on the other side of HMD 100 to facilitate presenting compensatory images to both eyes of a wearer of HMD 100.

FIGS. 2A-2F illustrate scene light and steered display light with respect to pupil position, in accordance with embodiments of the disclosure. In FIG. 2A, real-world scene light 271 is incident on the entire eye 202 and propagates through the pupil 203 and is focused by a lens of the eye 202 (not illustrated) onto retina 207. In FIG. 2A, eye 202 is unrotated and looking straight ahead. In FIG. 2B, eye 202 has rotated to a second position and real-world scene light 271 is still focused onto retina 207 because the real-world scene light 271 is presented over a large viewing eyebox.

FIG. 2C illustrates display light 272 propagating through pupil 203 and being focused for retina 207. Display light 272 may be generated by a display of an HMD. In FIG. 2D, display light 272 is incident on eye 202, but does not propagate through pupil 203 because pupil 203 is outside an eyebox area of the presented display light 272. Consequently, the user of an HMD would not see a virtual image included in display light 272 while eye 202 is rotated to the second position.

FIG. 2E illustrates steerable display light 273 propagating through pupil 203 and being focused for retina 207. Steerable display light 273 may be generated by a steerable display of an HMD. In FIG. 2F, eye 202 has rotated to the second position and the steerable display has been driven to direct steerable display light 276 to the new position of pupil 203 so that steerable display light 276 propagates through pupil 203 and is focused on retina 207. Since steerable display light 273/276 has a relatively small exit pupil, it may need to be steered to different pupil positions as eye 202 rotates so that the user of the HMD is able to view virtual images included in steerable display light 273/276 when the eyebox relocates.

Steerable displays are generally dependent on receiving eye-tracking data from an eye-tracking or prediction module that identifies or predicts a pupil position of pupil 203. For example, a camera may image the eye to determine where the pupil 203 is located and provide eye-tracking images as the eye-tracking data. The steerable display can then direct the steerable display light 273/276 to the new pupil position. A steerable display may include micro-electro-mechanical systems (MEMS) based mirrors that are moved, or an electro-optic mechanism to redirect display light 451 to different eyebox areas. During swift-eye movements, however, there may be some delay (e.g. 1 ms-300 ms) in identifying the new pupil position and driving the steerable display to direct steerable display light 276 to the new/predicted pupil position. In this delay period, the user of an HMD may be presented with a vignetted virtual image or no virtual image at all and notice the undesirable discontinuity in the user experience.

Figure 3:
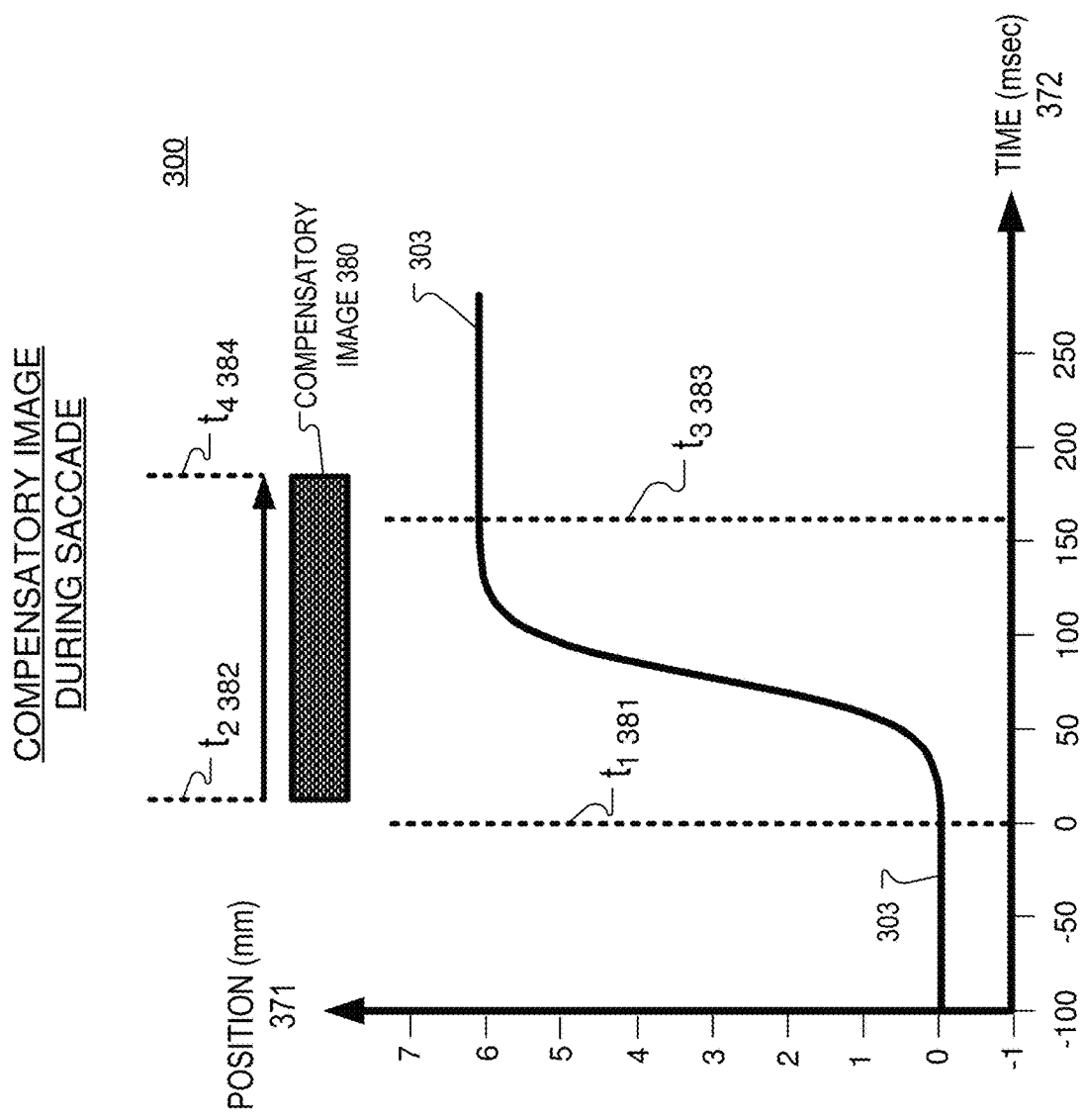
FIG. 3 includes an example chart showing the presentation of a compensatory image with respect to an example pupil position profile during a saccade, in accordance with an embodiment of the disclosure.

FIG. 3 includes an example chart 300 showing the presentation of a compensatory image 380 with respect to an example pupil position profile 303 during a saccade, in accordance with embodiments of the disclosure. A saccade is a swift movement of the eye as it jumps from fixation on point to another. A saccade is one example of a swift-eye movement. In chart 300, the units of the horizontal axis are milliseconds 372 while the units of the vertical axis are millimeters 371. At time t1 381, the eye starts its saccadic movement by moving from a first eye position (associated with a 0 mm position of the vertical axis) to a second eye position (associated with the 6 mm position of the vertical axis). The first eye position may be similar to the position of eye 202 illustrated in FIG. 2E and the second eye position may be similar to the position of eye 202 in FIG. 2F. At time t3 383, the saccadic movement is finished as the position of the eye stabilizes in the second eye position. Between time t1 381 and t3 383, pupil position profile 303 shows the pupil position over time. In chart 300, the duration of the saccadic movement between t1 381 and t3 383 is approximately 160 ms.

At time t2 382, compensatory image 380 is presented by a secondary display of the HMD. Prior to time t2 382, a steerable display may present a virtual image to the eye of the user. Compensatory image 380 is presented to an eye of the user between times t2 382 and t4 384, in the illustrated example. While compensatory image 380 is presented by a secondary display of the HMD, the steerable display may be blanked so that only compensatory image 380 is presented between times t2 382 and t4 384. The time between time t1 381 and time t2 383 may be the time between a tracking module identifying a swift-eye movement (e.g. saccade) and driving the secondary display to present compensatory image 380. The time between time t3 383 and time t4 384 may be the time between a tracking module identifying an end to a swift-eye movement (e.g. saccade) and re-activating the steerable display to present the virtual image to the eye of the user. When the steerable display resumes presenting the virtual image, the secondary display may cease presenting compensatory image 380. Compensatory image 380 may have a similar brightness and/or a similar spatial frequency spectrum as the virtual images being presented prior to the swift-eye movement, as will be described in embodiments below.

Figure 4:
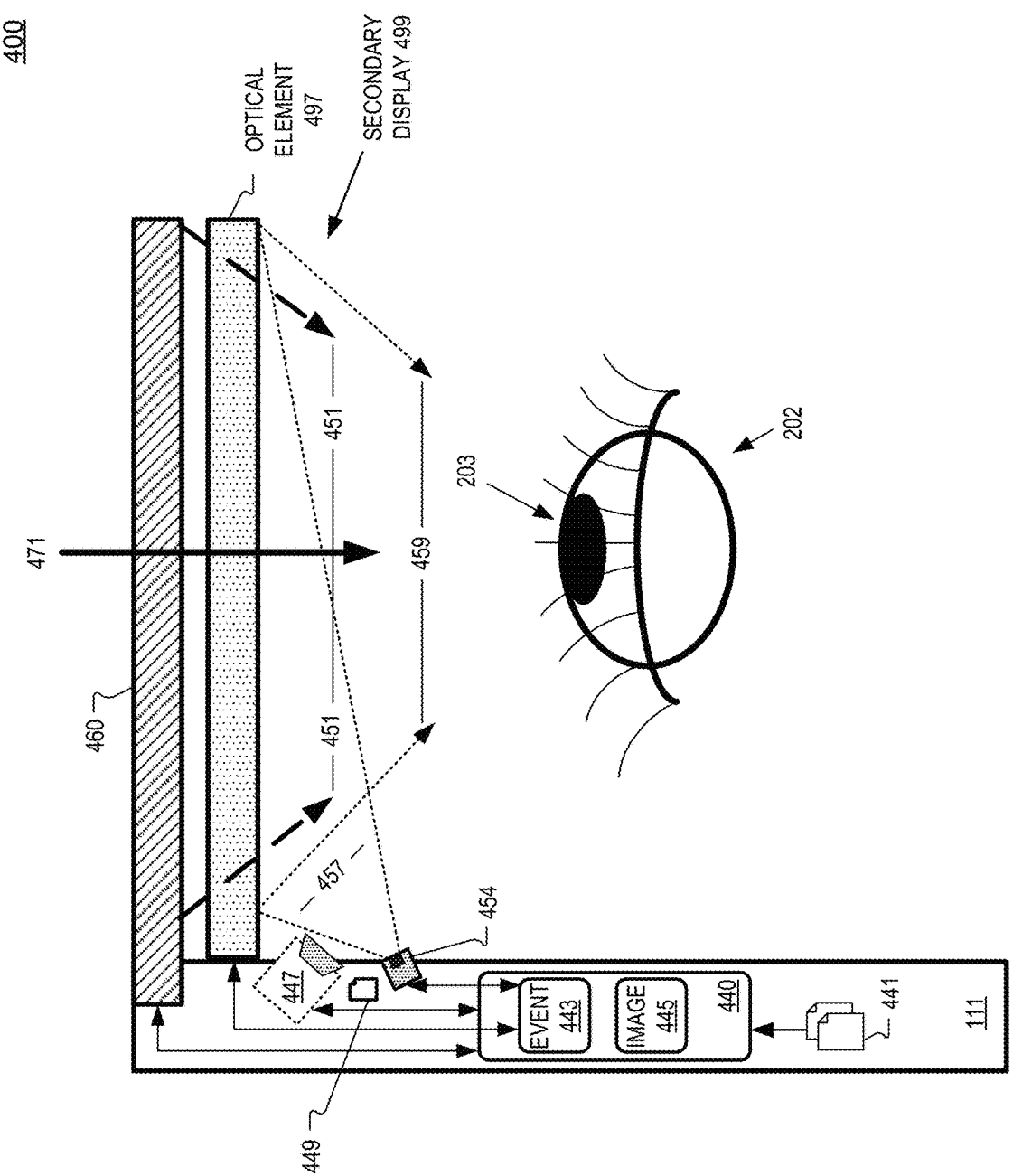
FIG. 4 illustrates a top view of an optical system for presenting a compensatory image to an eye of a user of an HMD, in accordance with an embodiment of the disclosure.

FIG. 4 illustrates a top view of an optical system 400 for presenting a compensatory image to an eye 202 of a user of an HMD, in accordance with an embodiment of the disclosure. Optical system 400 includes a display 460, a secondary display 499 including an optical element 497 and an illumination element 454. Display 460 is a steerable display for presenting virtual images to a relocatable eyebox area. In other words, the steerable display is capable of directing display light 451 that includes the virtual image to different eyebox areas according to the movement of pupil 203. As eye 202 moves, pupil 203 will occupy a different location and steerable display 460 may redirect light 451 to where the pupil is or is predicted to be. In one embodiment, steerable display 460 includes micro-electro-mechanical systems (MEMS) based mirrors that are moved, or an electro-optic mechanism to redirect display light 451 to different eyebox areas. Secondary display 499 is disposed between the steerable display 460 and a relocatable eyebox area where the steerable display directs its display light 451. Secondary display 499 may also be positioned behind steerable display 460. All or a portion of displays 460 and 499 may be transparent or semi-transparent to allow scene light 471 from an external environment of the user to become incident on eye 202 so that a user can view her external environment in addition to viewing virtual images.

In some embodiments, sensor 447 captures tracking data 449 for locating eye 202. Sensor 447 may include a camera having a complementary metal-oxide semiconductor (CMOS) image sensor, in some embodiments. An infrared filter that receives a narrow-band infrared wavelength may be placed over the image sensor so it is sensitive to the narrow-band infrared wavelength while rejecting visible light and wavelengths outside the narrow-band. Infrared illuminators (not illustrated) such as infrared LEDs that emit the narrow-band wavelength may be oriented to illuminate eye 202 with the narrow-band infrared wavelength. When sensor 447 includes a camera, the camera may capture eye-tracking images of eye 202 to determine a pupil location of pupil 203. The eye-tracking images may be provided to event engine 443 of processing logic 440 as tracking data 449 for processing and analysis to determine the pupil location. Processing logic 440 is communicatively coupled to display 460 and processing logic 440 may drive steerable display 460 to direct display light 451 to different eyebox areas based at least in part on the tracking data 449.

System 400 includes secondary display 499 that includes optical element 497 and illumination element 454. Illumination element 454 includes at least one light source configured to illuminate optical element 497 with illumination light 457. Optical element 497 redirects the illumination light 457 to the eye 202 as compensatory display light 459 that includes the compensatory image. In one embodiment, optical element 497 includes a diffractive structure configured to redirect the illumination light 457 to the eyebox area as the compensatory image. The eyebox area of the compensatory image may be significantly larger than the size of the steered eyebox of the primary display. The diffractive structure may be wavelength-selective to the wavelength-band of the illumination light, angularly-selective to an angle of illumination light 457 (emitted by a light source included in illumination element 454) with respect to the optical element 497, and/or polarization-selective to a polarization of the illumination light.

In some embodiments, optical element 497 includes a second diffractive structure and illumination element 454 includes a corresponding second light source configured to illuminate the second diffractive structure with second illumination light. The second diffractive structure is configured to redirect the second illumination light to the eye 202 as second compensatory image light that includes the second compensatory image. The second illumination light (not specifically illustrated) may follow an optical path somewhat similar to the illustrated illumination light 457 and the second compensatory display light may follow an optical path somewhat similar to the illustrated compensatory display light 459. The second diffractive structure may be wavelength selective to the wavelength-band of the second illumination light and/or angularly selective to an angle of the second illumination light (emitted by a second light source included in illumination element 454) with respect to the optical element 497.

In some embodiments, the second diffractive structure is "stacked" behind the first diffractive structure and the second illumination light propagates through the first diffractive structure before becoming incident on the second diffractive structure. In one embodiment, the first and second diffractive structure are multiplexed onto approximately the same volume. The first and second light source in illumination element 454 may be laser diodes, LEDs, superluminescent diode (SLED), or other light sources. The light sources may be narrow-band light sources of different wavelengths in the visible range. The diffractive structures may be tuned specifically to redirect light from the specific wavelengths emitted by their corresponding light source. In some embodiments, the light sources are disposed at substantially different locations on arm 111 and the light sources therefore illuminate optical element 497 at different angles. The diffractive structures may be tuned to redirect light received from the angle of illumination light emitted by the corresponding light source.

In operation, illumination element 454 can be driven to selectively present a first compensatory image (by illuminating the first light source corresponding to the first diffractive structure) or a second compensatory image (by illuminating the second light source corresponding to the second diffractive structure). Of course, an array of additional different light sources may be utilized that correspond to a plurality of diffractive structures included in optical element 497 such that any number of compensatory images may be presented to the eye 202 by illuminating different diffractive structures within optical element 497. The first, second, or subsequent diffractive structures utilized in optical element 497 may include any of a hologram, a Bragg grating, a volume hologram, a polarized volume hologram, or a switchable liquid crystal volume hologram.

In one embodiment, optical element 497 includes a diffuse layer that scatters illumination light 457 toward eye 202, creating a substantially uniform illumination pattern over all angles. In some embodiments, light source 457 may comprise a projector that projects a pattern over the diffusive layer, in which the pattern can be controlled to create different spatial frequency spectrums. Illumination element 454 may be modulated to change the brightness of illumination light 457 in response to a determined luminance value of a virtual image being presented by display 460. In one embodiment, virtual image(s) 441 are provided to processing logic 440 for presentation in display light 451. Processing logic 440 is coupled to receive virtual images 441 and coupled to drive the virtual image 441 onto display 460. Images 441 may be received from an on-board memory (not illustrated) included in HMD 100, for example. Images 441 may also be wirelessly transmitted to the HMD and received by a wireless interface (not illustrated) of the HMD.

In some embodiments, image characterization engine 445 is configured to determine a luminance value of at least one of the images 441 that are driven onto display 460. The luminance value of an image may be determined by an average intensity (grey scale) value of pixels in the image. Event engine 443 of processing logic 440 may be configured to independently modulate the intensity of one or more of the light sources in illumination element 454 based at least in part on the luminance value determined by image characterization engine 445. In some embodiments, the intensities of different color channels (e.g. different color LEDs or laser diodes) of light sources in illuminate element 454 are modulated based at least in part on the luminance value determined by image characterization engine 445.

In some embodiments, image characterization engine 445 is configured to determine a spatial frequency spectrum of at least one of the images 441 that are driven onto display 460. The spatial frequency spectrum of an image may be determined by performing a Fourier Transform on the image. Event engine 443 may be configured to selectively illuminate a particular diffractive structure in optical element 497 by activating a corresponding light source in illumination element 454 based at least in part on the spatial frequency spectrum determined by image characterization engine 445. Illumination element 454 may include a first light source that illuminates a first diffractive structure that presents a first compensatory image having a first spatial frequency spectrum in compensatory display light 459. Illumination element 454 may include a second light source that emits second-patterned illumination light that illuminates a second diffractive structure that presents a second compensatory image having a second spatial frequency spectrum in compensatory display light 459. Therefore, compensatory images with different spatial frequency spectrums can be generated by selecting different light sources to illuminate different diffractive structures in optical element 497.

In some embodiments, illumination element 454 includes an array (more than two) light sources corresponding to an array (more than two) diffractive structures in optical element 497 that generate compensatory images with a range of spatial frequencies. Consequently, a compensatory image with a spatial frequency that is closest to the spatial frequency spectrum of a received image 441 may be driven onto secondary display 499. In some embodiments, more than one light source may be activated simultaneously to compose a spatial frequency spectrum that is the combination of multiple diffractive structures. The diffractive structures in the array may be configured to generate pseudo-random patterns of different spatial frequency distributions. By presenting a compensatory image with a spatial frequency (or pseudo-random pattern of a given spatial frequency) that is somewhat close to the spatial frequency spectrum of an image 441 that was generated by display 460, the user may not detect the compensatory image presented during a swift-eye movement because the spectral content of the image scene by the user of the HMD remains approximately similar.

In one embodiment, the compensatory image includes a "pink noise" image having a particular spatial frequency spectrum. In one embodiment, the compensatory image includes a "brown noise" image having a particular spatial frequency spectrum. In some embodiments, there are ten light sources in illumination element 454 and corresponding ten diffractive structures in optical element 497 that generate ten different compensatory images. Other integer number of light sources and corresponding diffractive structures may be used.

When a spatial frequency spectrum of an image 441 that is presented by display 460 is known and a swift-eye-movement is detected, display 460 may be blanked (deactivated) in response to identify the swift-eye movement. While display 460 is deactivated and not presenting display light 451, the compensatory image is presented. Display 460 may be activated to present images in display light 451 after a pre-determined time period (e.g. 100 ms, 150 ms, 200 ms). The compensatory image may be presented only during that pre-determined time period. In one embodiment, display 460 is activated to present images in display light 451 in response to identify an end of the swift-eye movement. An end of the swift-eye movement may be determined by analyzing tracking data 449 for pupil position 203 and identifying whether eye 202 is in (or predicted to remain) in a stable eye position where display 460 can present images in display light 451.

In embodiments of the disclosure, compensatory display light 459 generated by secondary display 499 generates a larger viewing eyebox than display light 451 emitted by display 460. By providing a larger viewing eyebox for compensatory images included in compensatory display light 459, the compensatory image will be incident on pupil 203 even when a (potentially) narrower eyebox area associated with display light 451 has not yet been redirected to the new pupil position.

Figure 5:
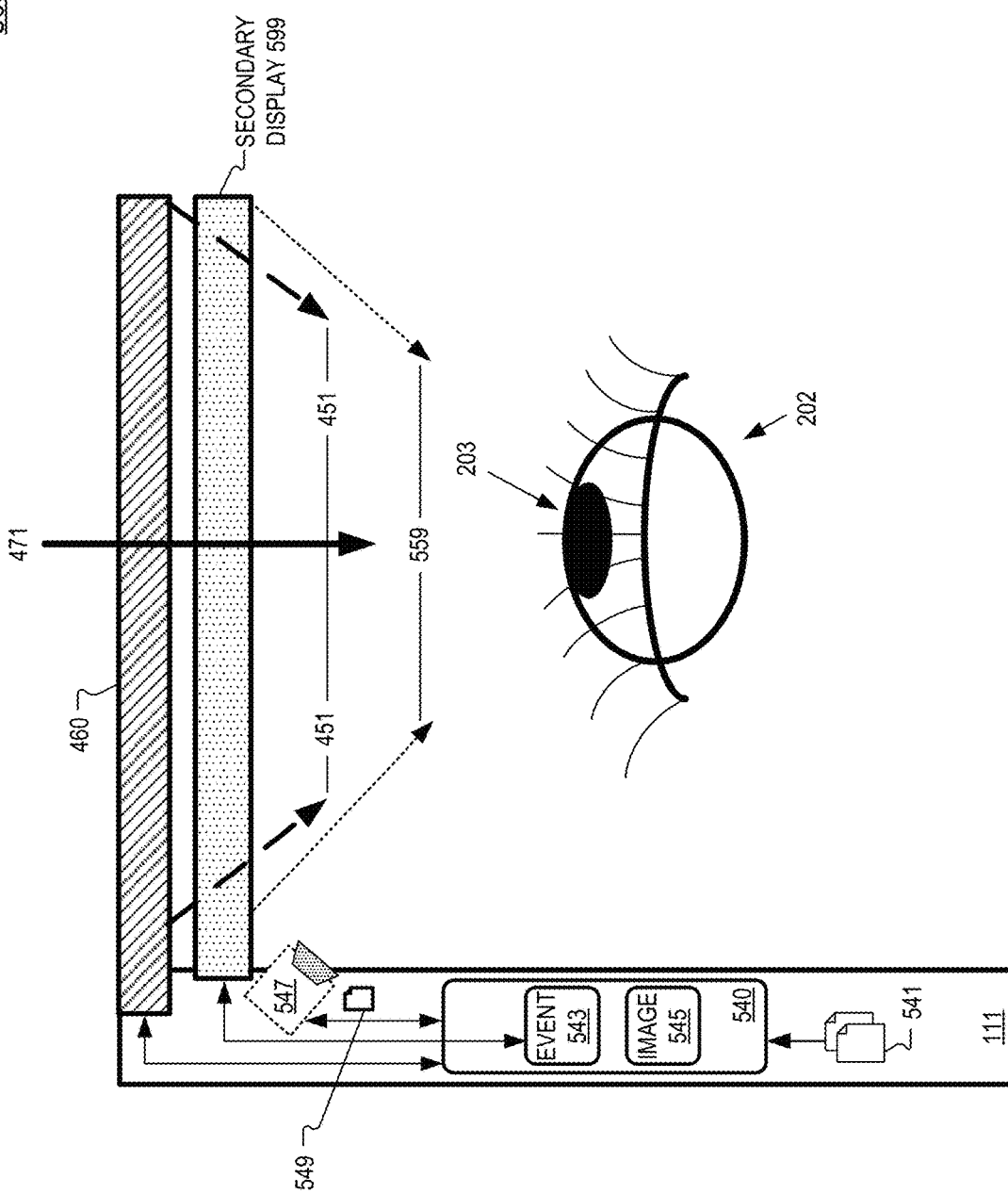
FIG. 5 illustrates a top view of an optical system for presenting a compensatory image to an eye of a user of an HMD with a transparent display pixel array, in accordance with an embodiment of the disclosure.

FIG. 5 illustrates a top view of an optical system 500 for presenting a compensatory image to an eye 202 of a user of an HMD with a transparent display pixel array, in accordance with an embodiment of the disclosure. Optical system 500 includes display 460 and a secondary display 599. Display 460 is a steerable display for presenting virtual images to a relocatable eyebox area. Optical system 500 does not have an illumination element such as the illumination element 454 that optical system 400 includes. Instead, secondary display 599 includes a transparent or semi-transparent display pixel array such as a transparent organic light emitting diode (OLED), a micro-LED display, or a transparent liquid crystal display (LCD). Although a "transparent" display may occlude small portions of the user's FOV, occlusions related to a transparent display are not generally noticed by the user or the occlusions are located so close to the eye of the user that the user is not capable of focusing on them, and therefore, the occlusions are not noticeable. All or a portion of display 460 may be transparent or semi-transparent to allow scene light 471 from an external environment of the user to become incident on eye 202 so that a user can view his external environment in addition to viewing virtual images.

In some embodiments, sensor 547 captures tracking data 549 for locating eye 202. Sensor 547 may include a camera having a complementary metal-oxide semiconductor (CMOS) image sensor, in some embodiments. An infrared filter that receives a narrow-band infrared wavelength may be placed over the image sensor so it is sensitive to the narrow-band infrared wavelength while rejecting visible light and wavelengths outside the narrow-band. Infrared illuminators (not illustrated) such as infrared LEDs that emit the narrow-band wavelength may be oriented to illuminate eye 202 with the narrow-band infrared wavelength. When sensor 547 includes a camera, the camera may capture eye-tracking images of eye 202 to determine a pupil location of pupil 203. The eye-tracking images may be provided to event engine 543 of processing logic 540 as tracking data 549 for processing and analysis to determine the pupil location. Processing logic 540 may drive steerable display 460 to direct display light 451 to different eyebox areas based at least in part on the tracking data 549.

Event engine 543 may drive the display pixel array of secondary display 599 to generate a compensatory image. In an embodiment, a brightness of the compensatory image is modulated in response to a determined luminance value of a virtual image being presented by display 460. In one embodiment, virtual image(s) 541 are provided to processing logic 540 for presentation in compensatory display light 559. Processing logic 540 is coupled to receive virtual images 541 and coupled to drive the virtual image 541 onto display 460. Images 541 may be received from an on-board memory (not illustrated) included in HMD 100, for example.

Images 541 may also be wirelessly transmitted to the HMD and received by a wireless interface (not illustrated) of the HMD.

In some embodiments, image characterization engine 545 is configured to determine a luminance value of at least one of the images 541 that are driven onto display 460. The luminance value of an image may be determined by an average intensity (grey scale) value of subpixels in the image. Event engine 543 of processing logic 540 may be configured to modulate the intensity of the compensatory image driven onto secondary display 599 based at least in part on the luminance value determined by image characterization engine 545.

In some embodiments, image characterization engine 545 is configured to determine a spatial frequency spectrum of at least one of the images 541 that are driven onto display 460. The spatial frequency spectrum of an image may be determined by performing a Fourier Transform on the image. Secondary display 599 may then display an image including a pseudo-random pattern having a spatial frequency spectrum similar to the image 541 that was displayed on display 460.

When a spatial frequency spectrum of image 541 that is presented by display 460 is known and a swift-eye-movement is detected, display 460 may be blanked (deactivated) in response to identify the swift-eye movement. While display 460 is deactivated and not presenting display light 451, the compensatory image is presented in compensatory display light 559. Display 460 may be activated to present images in display light 451 after a pre-determined time period (e.g. 100 ms, 150 ms, 200 ms). In one embodiment, display 460 is activated to present images in display light 451 in response to identify an end of the swift-eye movement. An end of the swift-eye movement may be determined by analyzing tracking data 549 for pupil position 203 and identifying whether eye 202 is in (or predicted to remain) in a stable eye position where display 460 can present images in display light 451. In embodiments of the disclosure, compensatory display light 559 generated by secondary display 599 generates a larger viewing eyebox than display light 451 emitted by display 460.

Figure 6A:
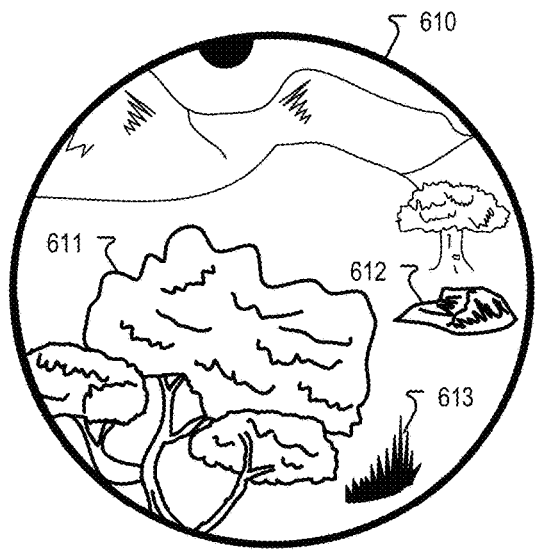
FIGS. 6A-6C illustrate an image displayed by a steerable display and an example compensatory image presented by a secondary display, in accordance with an embodiment of the disclosure.
Figure 6B:
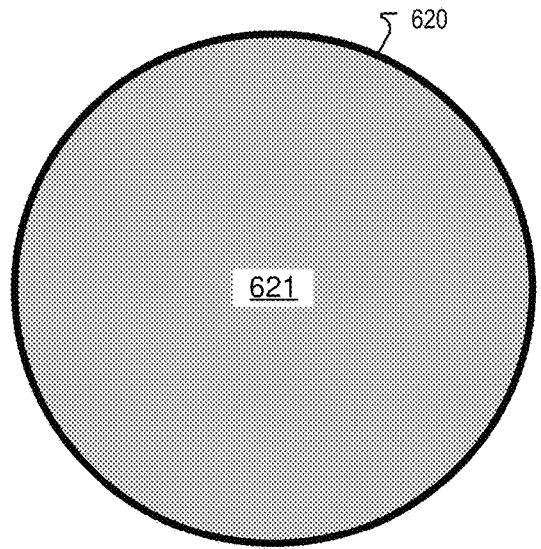
Figure 6C:
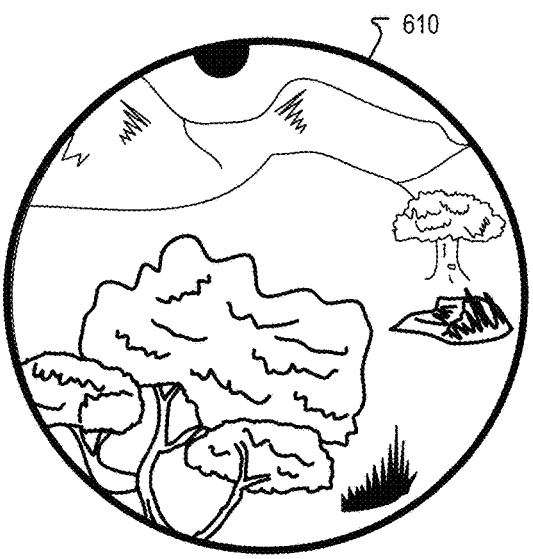

FIG. 6A illustrates an image 610 that may be included in a user's FOV by display 460, in accordance with an embodiment of the disclosure. Image 610 includes a tree 611, a rock structure 612, and reeds 613. Image 610 is an example of an image 441/541 that may be presented by display 460. Image 610 may be presented to the user prior to time t2 382, in FIG. 3. At time t2 382, luminance image 620 of FIG. 6B may be generated by a secondary display (e.g. 499 or 599) as compensatory image 380. Luminance image 620 may have a luminance value 621 that approximates an average luminance of image 610. Image characterization logic 445/545 may calculate the average luminance value of image 441/541 and select image 620 from a plurality of luminance images for displaying on the secondary display. FIG. 6C shows that image 610 may be presented to the user after the end of a swift-eye movement and after compensatory image 620 is presented to the user at time t4 384, for example.

Figure 7A:
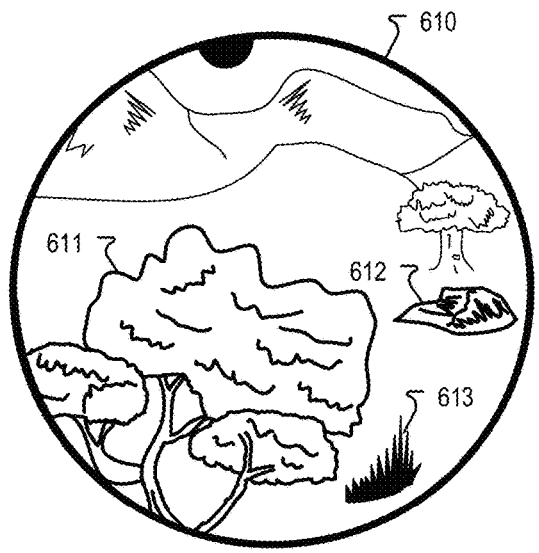
FIGS. 7A-7C illustrate an image displayed by a steerable display and an example compensatory image presented by a secondary display, in accordance with an embodiment of the disclosure.
Figure 7B:
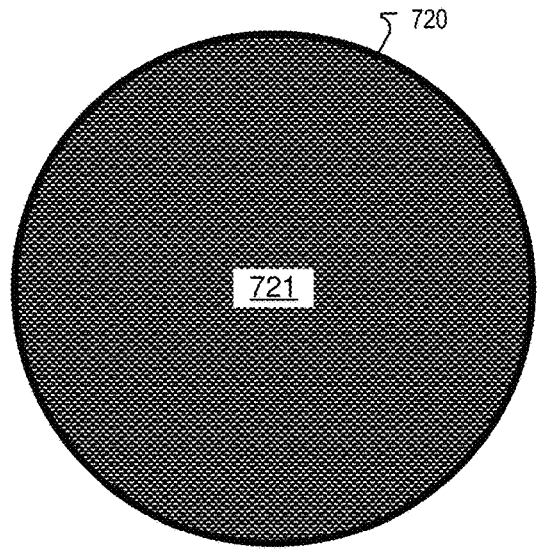
Figure 7C:
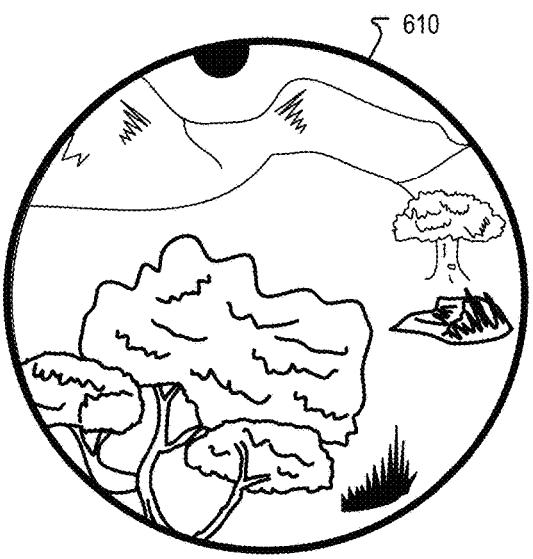

FIG. 7A illustrates image 610 that may be included in a user's FOV by display 460, in accordance with an embodiment of the disclosure. Image 610 may be considered a "natural image" since it depicts a landscape scene. Image 610 may be presented to the user prior to time t2 382, in FIG. 3. At time t2 382, spatial image 720 of FIG. 7B may be generated by a secondary display (e.g. 499 or 599) as compensatory image 380. Spatial image 720 may have a spatial frequency pattern 721 that approximates a spatial frequency spectrum of image 610. The spatial frequency pattern of spatial image 720 may be a pseudo-random pattern of a given spatial frequency distribution that approximates the spatial frequency spectrum of image 610. In some embodiments, spatial image 720 includes a pseudo-random pattern of pink noise or white noise. Image characterization logic 445/545 may calculate the spatial frequency spectrum of image 441/541 and select image 720 from a plurality of spatial images for displaying on the secondary display. FIG. 7C shows that image 610 may be presented to the user after the end of a swift-eye movement and after compensatory image 720 is presented to the user at time t4 384, for example.

Figure 8A:
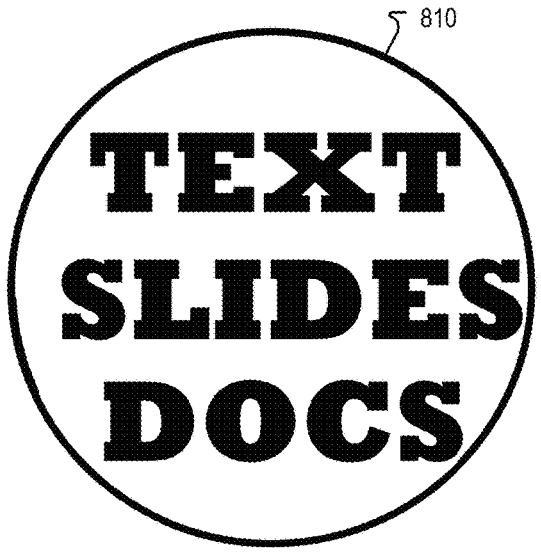
FIGS. 8A-8C illustrate an image displayed by a steerable display and an example compensatory image presented by a secondary display, in accordance with an embodiment of the disclosure.
Figure 8B:
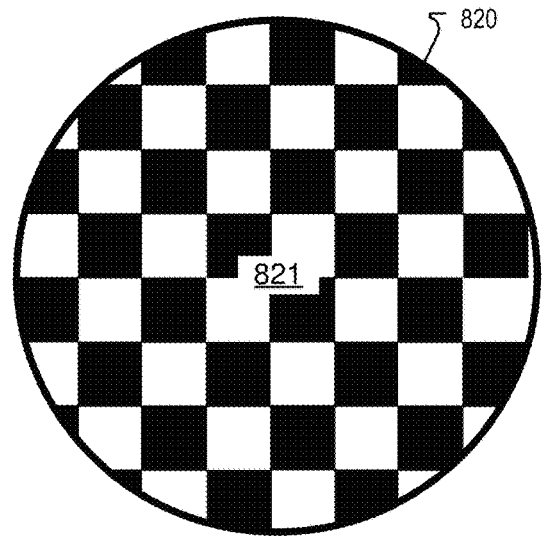

FIG. 8A illustrates image 810 that may be included in a user's FOV by display 460, in accordance with an embodiment of the disclosure. Image 810 may be considered a "text-based" image since it includes rows of text. A "text-based" image may also include lines or other simple shapes that have a large proportion of high contrast edges. When a significant amount of text is present in an image, the height and width of the letters as well as the spacing between letters is often consistent. Furthermore, the space between rows or columns of text and the spacing of the text from an edge of the image (margins) is often consistent.

Figure 8C:
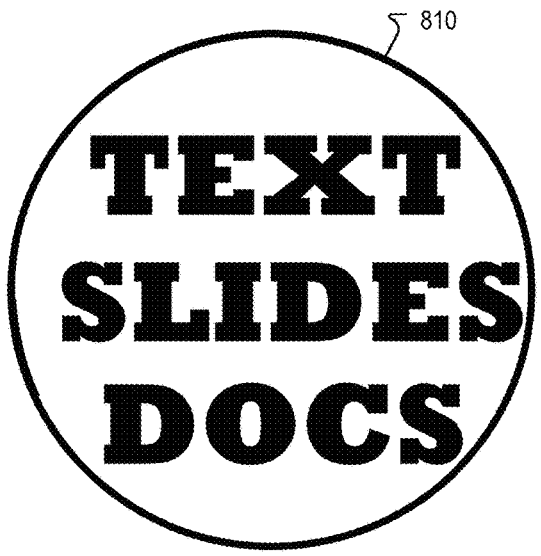

Image 810 may be presented to the user prior to time t2 382, in FIG. 3. At time t2 382, example spatial image 820 of FIG. 8B may be generated by a secondary display (e.g. 499 or 599) as compensatory image 380. Spatial image 820 may have a spatial frequency pattern 821 that approximates a spatial frequency spectrum of image 810. The spatial frequency pattern of spatial image 820 may be a pseudo-random pattern of a given spatial frequency distribution that approximates the spatial frequency spectrum of image 810. Similar to image 720, image 820 may not actually be a checkerboard, but rather a pseudo-random pattern that includes features spaced according to the spatial frequency spectrum of image 810. In some embodiments, spatial image 820 includes a pseudo-random pattern of pink noise or white noise. Image characterization logic 445/545 may calculate the spatial frequency spectrum of image 441/541 and select image 820 from a plurality of spatial images for displaying on the secondary display. FIG. 8C shows that image 810 may be presented to the user after the end of a swift-eye movement and after compensatory image 820 is presented to the user at time t4 384, for example.

Figure 9:
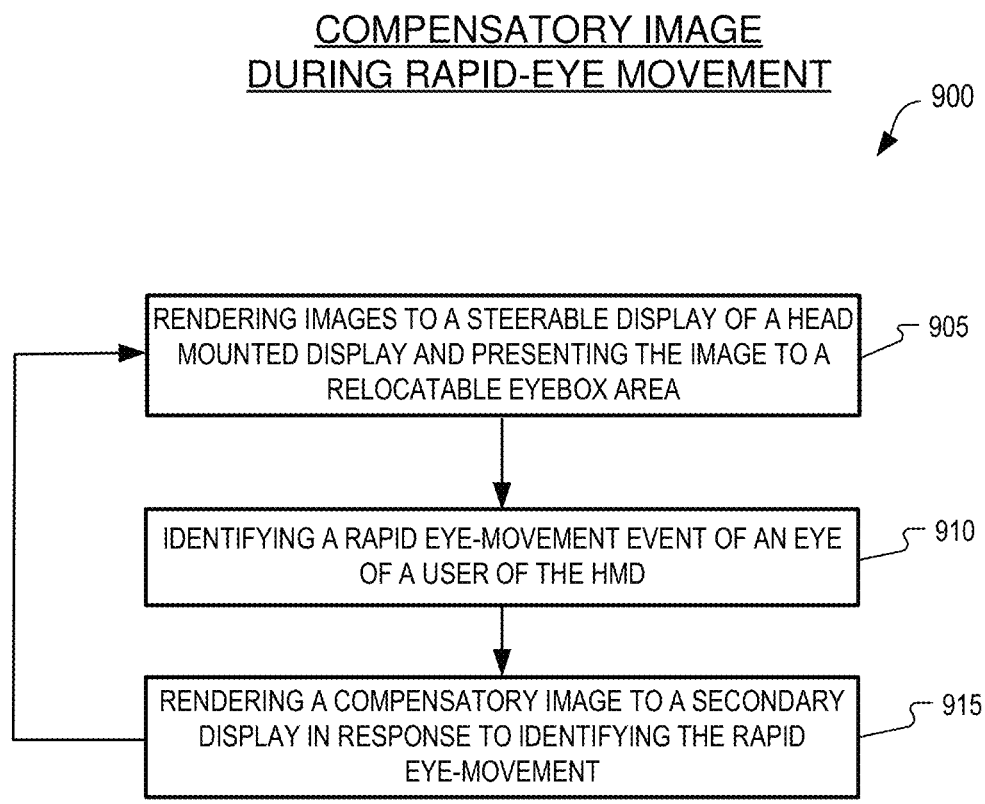
FIG. 9 illustrates a flow chart of an example process of providing a compensatory image during a swift-eye movement, in accordance with an embodiment of the disclosure.

FIG. 9 illustrates a flow chart of an example process 900 of providing a compensatory image during a swift-eye movement, in accordance with an embodiment of the disclosure. The order in which some or all of the process blocks appear in process 900 should not be deemed limiting. Rather, one of ordinary skill in the art having the benefit of the present disclosure will understand that some of the process blocks may be executed in a variety of orders not illustrated, or even in parallel.

In process block 905, images are rendered to a steerable display (e.g. 4600 of a head mounted display. The steerable display presents the images to a relocatable eyebox area.

In process block 910, a swift-eye movement event of an eye of the user of the HMD is identified where the swift-eye movement event indicates that the images presented by the steerable display have or will miss a pupil of the eye of the user of the head mounted display. The swift-eye movement event may be identified by event logic (e.g. 443/543) that receives tracking data (e.g. tracking data 449/549) from a sensor of the HMD.

In process block 915, a compensatory image is rendered to a secondary display (e.g. 499/599) in response to identifying the swift-eye movement event. The secondary display may be disposed between the steerable display and the relocatable eyebox area. Compensatory display light (e.g. 459/559) from the secondary display may generate a larger viewing eyebox that the display light (e.g. 451) emitted by the steerable display.

Some embodiments of process 900 further include blanking the steerable display in response to identifying the swift-eye movement event, where blanking the steerable display prevents the images from being presented to the eye. Blanking the steerable display may include disabling a light source of the display or driving the pixels of the steerable display to black. Some embodiments of process 900 may further include reactivating the steerable display to present the images to the eye after a pre-determined time period after the swift-eye movement is identified. Other embodiments of process 900 may further include identifying an end to the swift-eye movement and reactivating the steerable display to present image to the eye in response to identifying the end to the swift-eye movement event. Identifying the end of the swift-eye movement event may include analyzing eye-tracking images of the eye to determine whether the eye position has stabilized.

The compensatory image presented in process block 915 may differ based on the image that was presented by the steerable display immediately prior to the identification of the swift-eye movement event. The compensatory image presented may approximate the luminance value and/or the spatial frequency of the image being presented by the steerable display.

In an embodiment, a luminance value of at least one of the images rendered to the steerable display is determined. The luminance value may be an average value of greyscale values of the pixels of the image, for example. The compensatory image rendered in process block 915 may be based at least in part on the luminance value of the image. In some embodiments, the compensatory image is based on the luminance value of the image and the spatial frequency of the image. In some embodiments, the luminance values will be calculated and controlled independently for each color channel.

Process 900 may further include determining a spatial frequency spectrum of at least one of the images rendered by the steerable display and selecting the compensatory images to render to the secondary display based at least in part on the determined spatial frequency spectrum. Selecting the compensatory image may include selecting a representative compensatory image from a pre-determined group of images having varying spatial frequency content, where the representative compensatory image is the closest match to the determined spatial frequency spectrum of the images rendered by the steerable display prior to the swift-eye movement event. Determining the spatial frequency of an image may include performing a Fourier Transform on the image.

In some embodiments, the compensatory image presented in process block 915 is dependent on whether the image provided by the steerable display is similar to a natural image or similar to a text-based image. Natural images and text-based images tend to have identifiable artifacts in their spatial frequency signatures. For example, natural images tend to have more power in lower frequencies. Additionally, the power spectra of natural images often have the power fall off (at a roughly constant rate in logarithmic space) with increased spatial frequency. While natural images tend to have decreasing power with increased spatial frequency, text-based images typically have power peaks at multiple frequencies. The peaks at certain frequencies may be associated with the width of each line of text (low frequency), the spacing between lines (mid-range frequency), and the effective font-size and spacing between letters (high frequency). There may also be high-frequency harmonics due to the "hard-edge" of text. Based on these differences in natural images and text-based images, image characterization engine 445 or 545 may select a compensatory image for displaying with the secondary display that has a close spatial frequency spectrum as the images driven onto the steerable display.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 440 or 540) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method comprising:
   rendering images to a display;
   identifying a swift-eye movement; and
   rending a compensatory image to a secondary display in response to identifying the swift-eye movement, wherein compensatory display light from the secondary display generates a larger viewing eyebox than display light emitted by the display.

2. The computer-implemented method of claim 1, wherein the secondary display is disposed between the display and an eyebox area.

3. The computer-implemented method of claim 1, wherein the display is a steerable display.

4. The computer-implemented method of claim 1 further comprising:
   blanking the display in response to identifying the swift-eye movement, wherein blanking the display prevents the images from being presented to an eyebox area.

5. The computer-implemented method of claim 4 further comprising:
   identifying an end to the swift-eye movement; and
   reactivating the display to present the images to the eyebox area in response to identifying the end to the swift-eye movement.

6. The computer-implemented method of claim 4 further comprising:
   reactivating the display to present the images to the eyebox area after a pre-determined time period.

7. The computer-implemented method of claim 1 further comprising:
   determining a luminance value of at least one of the images rendered by the display; and selecting the compensatory image to render to the secondary display based at least in part on the luminance value.

8. The computer-implemented method of claim 7, wherein the luminance value is approximately equivalent to an average luminance of the at least one of the images.

9. The computer-implemented method of claim 1 further comprising:
determining a spatial frequency spectrum of at least one of the images rendered by the display; and
selecting the compensatory image to render to the secondary display based at least in part on the spatial frequency spectrum.

10. The computer-implemented method of claim 9, wherein determining the spatial frequency spectrum includes performing a Fourier Transform of the at least one of the images.

11. The computer-implemented method of claim 9, wherein selecting the compensatory image includes selecting a representative compensatory image from a pre-determined group of images having varying spatial frequency content, the representative compensatory image being a closest match to the determined spatial frequency spectrum of the at least one image rendered by the display.

12. A system comprising:
display means for rendering images;
sensing means for generating tracking data of an eyebox area;
processing means for identifying a swift-eye movement based at least in part on the tracking data generated by the sensing means; and
second display means for presenting a compensatory image to the eyebox area in response to the processing means identifying the swift-eye movement, wherein compensatory display light of the compensatory image presented by the secondary display means generates a larger viewing eyebox than display light of the images emitted by the display means.

13. The system of claim 12 further comprising:
image characterization means for determining a spatial frequency spectrum of at least one of the images presented by the display means, wherein the compensatory image is based at least in part on the spatial frequency spectrum determined by the image characterization means.

14. The system of claim 12 further comprising:
image characterization means for determining a luminance value of at least one of the images presented by the display means, wherein the compensatory image is based at least in part on the luminance value determined by the image characterization means.

15. The system of claim 12, wherein the compensatory image includes a pseudo-random pattern of a given spatial frequency distribution.

16. The system of claim 12, wherein the second display means is disposed between the display means and the eyebox area.

17. A device comprising:
a display configured to present images to an eyebox area;
a sensor configured to generate tracking data from the eyebox area;
an event engine configured to identify a swift-eye movement event based at least in part on receiving the tracking data from the sensor; and
a secondary display, wherein the event engine is configured to activate the secondary display to present a compensatory image to the eyebox area in response to the event engine identifying the swift-eye movement event, wherein compensatory display light from the secondary display generates a larger viewing eyebox than display light emitted by the display.

18. The device of claim 17, wherein the secondary display is disposed between the display and the eyebox area.

19. The device of claim 17, wherein the compensatory image includes a pseudo-random pattern of a given spatial frequency distribution.

* * * * *